United States Patent
Marvin et al.

(10) Patent No.: US 6,401,875 B1
(45) Date of Patent: Jun. 11, 2002

(54) ABSOLUTE POSITION SENSING METHOD AND APPARATUS FOR SYNCHRONOUS ELEVATOR MACHINES BY DETECTION STATOR IRON SATURATION

(75) Inventors: Daryl J. Marvin, Farmington, CT (US); Mark Shepard, Roanoke, VA (US); Todd A. Simonds, Colchester; Alberto Vecchiotti, Middletown, both of CT (US); Vladan Petrovic, Everett, MA (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/781,367

(22) Filed: Feb. 12, 2001

(51) Int. Cl.$^7$ .............................................. B66B 3/010
(52) U.S. Cl. ...................................... 187/393; 318/718
(58) Field of Search ................................ 318/254, 439, 318/700, 701, 705, 712, 714, 716, 718, 720, 721, 722; 187/391, 393, 413, 289, 293

(56) References Cited

U.S. PATENT DOCUMENTS

| | | | | |
|---|---|---|---|---|
| 5,117,165 A | * | 5/1992 | Cassat et al. ................ | 318/254 |
| 5,467,025 A | * | 11/1995 | Ray ........................... | 324/772 |
| 5,714,857 A | * | 2/1998 | Mannel et al. ............... | 318/432 |
| 5,729,113 A | * | 3/1998 | Jansen et al. ................ | 318/799 |
| 5,877,606 A | * | 3/1999 | Nozari ........................ | 318/700 |
| 5,936,370 A | * | 8/1999 | Fukao et al. ................. | 318/652 |
| 6,163,128 A | * | 12/2000 | Hiti et al. .................... | 318/722 |
| 6,177,777 B1 | * | 1/2001 | Piazzalunga ................. | 318/700 |
| 6,288,515 B1 | * | 9/2001 | Hiti et al. .................... | 318/722 |

OTHER PUBLICATIONS

Article entitled "Initial Rotor Angle Detection of a Non–Salient Pole Permanent Magnet Synchronous Machine"; authors Peter B. Schmidt, Michael L. Gasperi, Glen Ray, Ajiith H. Wijenayake; published as part of Conference Records at the IEEE Industry Applications Society Annual Meeting on Oct. 5–9, 1997.

* cited by examiner

Primary Examiner—Jonathan Salata (57) ABSTRACT

A method and apparatus of determining the position of a rotor at standstill relative to a stator in a synchronous motor elevator machine includes injecting an AC current having a predetermined single frequency and a predetermined initial phase angle into a stator coil of the stator, and sampling the injected current and resultant voltage a predetermined number of times per period of the frequency. Subsequently the method calculates a stator inductance from the sampled voltages and currents using a DFT. By incrementing the initial phase angel a predetermined number of times over a 360 degree cycle, and repeating the injecting, sampling, and calculating with each incremented phase angle, the algorithm provides a predetermined number of calculated stator inductances. The position of the d axis relative to the stator is then determined from the minimum of the calculated stator inductances.

28 Claims, 5 Drawing Sheets

ABSOLUTE POSITION SENSING METHOD AND APPARATUS FOR SYNCHRONOUS ELEVATOR MACHINES BY DETECTION STATOR IRON SATURATION

FIELD OF THE INVENTION

The present invention relates generally to angular position methods and devices for motors. More specifically, the present invention relates to a technique and apparatus to calculate the absolute angular position of a synchronous motor elevator machine at standstill by detecting stator iron saturation.

BACKGROUND OF THE INVENTION

Permanent magnet synchronous machines for elevator systems offer advantages over conventional induction elevator machines in the size required for a given duty. However, elevator systems utilizing synchronous motor elevator machines must be capable of detecting absolute angular rotor position, i.e., rotor magnetic flux d axis position and direction, relative to the stator pole windings to be able to achieve maximum torque.

This is particularly significant when the rotor position is lost due to circumstances such as a power failure. When an elevator experiences a power loss, the elevator brake is engaged to hold the elevator car in position. Once power is reestablished, torque to the elevator machine must be available and controlled when the machine brake is lifted to ensure controlled motion of the elevator car under unbalanced load conditions.

An incremental encoder with one index pulse has been used to establish absolute rotor position on prior art elevator machines. However, this may require up to one full revolution of the elevator machine to locate the index pulse after power loss. In larger elevator systems, one revolution of the elevator machine may result in as much as a one meter drop in the elevator car.

A technique that makes use of the saturation effect of the stator iron to detect the rotor position of a permanent magnet synchronous motor is disclosed in an article titled "Initial Rotor Angle Detection Of A Non-Salient Pole Permanent Magnet Synchronous Machine", published in the Conference Records of the IEEE-Industry Applications Society Annual Meeting, New Orleans, La. Oct. 5–9, 1997 (the article). The article describes a method whereby a broad frequency band voltage pulse, of appropriate magnitude and width, is applied to each phase winding of the stator. A single sample of stator peak current is then measured in the time domain for each winding and used to calculate inductance. Since the inductance will vary with the partial saturation of the stator iron and the flux due to the position of the rotor's magnets, the algorithm can discern between a north pole and a south pole, and subsequently, the absolute position of the rotor.

However, this technique has inherent sampling issues in a noisy environment, such as an elevator system, that limits the repeatability of the results. This is because the voltage pulse generated is inherently composed of a broad band of frequencies. Therefore, any noise within the frequency band of the voltage pulse, e.g., the switching rate of the transistors in the elevator's Alternating Current Variable Frequency drive, or any harmonics thereof, effects the accuracy of the readings. Also, with this technique, rotor position is calculated from a single inductance measurement. Therefore one bad sample due to noise can dramatically impact the inductance calculation. The irregular curves of the experimental results shown in the article's FIG. 6 demonstrate the inherent errors in the inductance measurements, since the expected curves should be smooth sinusiods.

Additionally, in order to obtain an appropriate signal/noise ratio using this technique, significantly large magnitude voltage pulses and peak currents, e.g., at or near the rated current values of the motor, are required. This imposes an undesirable amount of torque on the braking system. In order to compensate for the torque, immediately following the voltage pulse for one phase a voltage pulse in the opposite direction is fired to force the phase currents back to zero. This drives the free wheeling current to zero and helps to minimizes the time torque is applied to the motor.

There is therefore a need for an improved method of detecting absolute angular rotor position relative to the stator windings for a synchronous motor.

In another embodiment of the invention a DC offset current is injected with the AC current into the stator windings. The direction of the d axis is then determined from the minimum of the calculated stator inductances.

SUMMARY OF THE INVENTION

The present invention offers advantages and alternatives over the prior art by providing a method of determining the absolute angular position of a synchronous motor elevator machine after a power loss. An appropriate AC current at a predetermined frequency is injected into the stator windings of the motor in order to determine the stator inductance. The saturation of the stator back iron due to the magnetic flux caused by the permanent magnets enables the algorithm to determine the position and direction of the rotor magnetic flux d axis, and subsequently, the absolute position of the rotor relative to the stator of the synchronous motor. By using Fourier analysis to calculate the stator inductance, this method has a high degree of immunity to both repetitive and random noise often generated in such noisy environments as an elevator system. Additionally, the high signal to noise ratio of method allows the injected current to be relatively small compared to the rated currents of the motor, therefore imposing minimally low torque on the braking system of the elevator.

These and other advantages are accomplished in an exemplary embodiment of the invention by providing a method of determining the position of a rotor relative to a stator in a synchronous motor. The method comprises injecting an AC current having a predetermined single frequency and a predetermined initial phase angle into a stator coil of the stator, and sampling the injected current and resultant voltage a predetermined number of times per period of the frequency. Subsequently the method calculates a stator inductance from the sampled voltages and currents using a Discrete Fourier Transform (DFT). By incrementing the initial phase angel a predetermined number of times over a 360 degree cycle, and repeating the injecting, sampling, and calculating with each incremented phase angle, the algorithm provides a predetermined number of calculated stator inductances. The position of the d axis relative to the stator is then determined from the minimum of the calculated stator inductances.

In an alternate embodiment of the invention a DC offset current is injected into the stator windings after the stator inductances have been calculated. A single stator inductance is then recalculated, and the direction of the d axis is determined from the recalculated stator inductance.

DETAILED DESCRIPTION OF THE PREFERRED EMBODIMENTS

Figure 1:
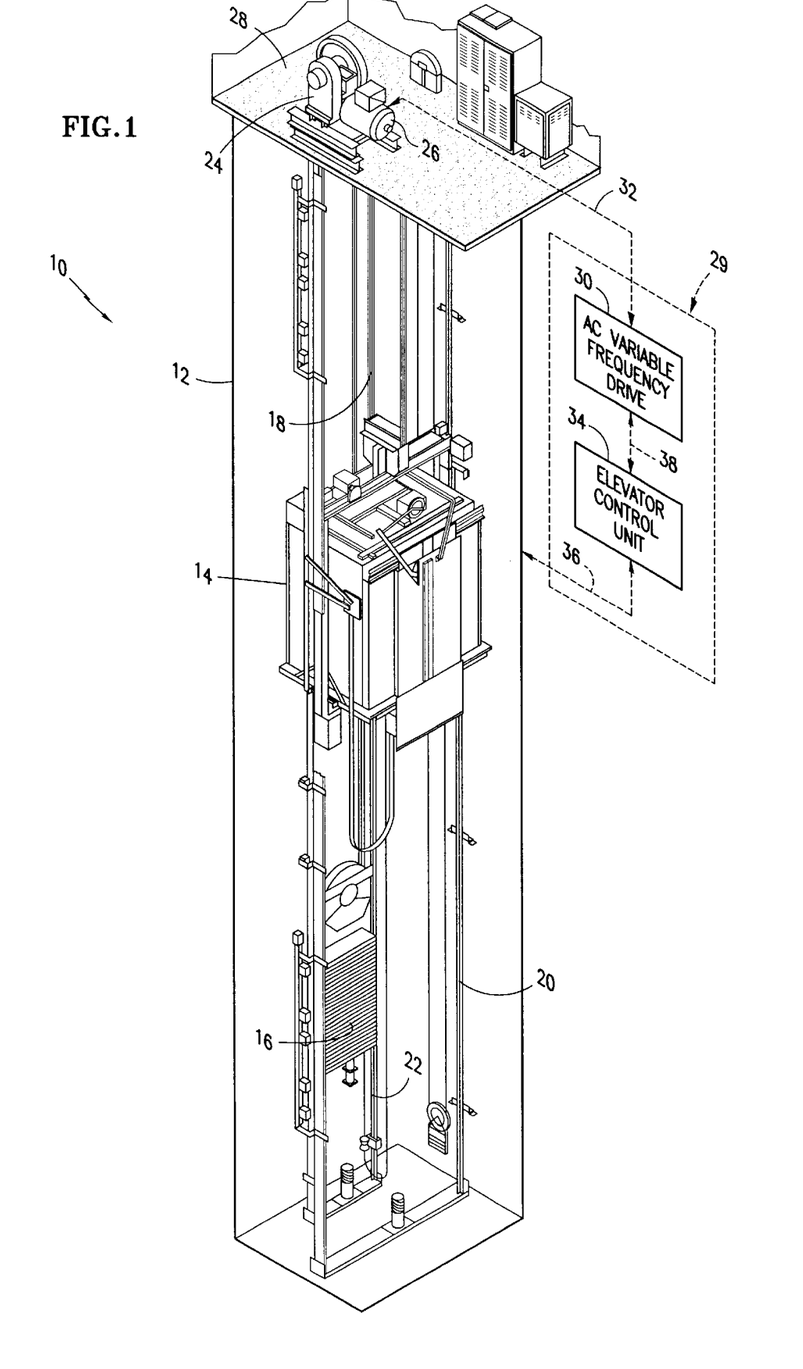
FIG. 1 is a schematic perspective view of an elevator system having a synchronous motor elevator machine in accordance with the present invention.

Referring to FIG. 1, an exemplary embodiment of an elevator system in accordance with the present invention is shown generally at 10. The elevator system comprises an elevator hoistway 12, having an elevator car 14 positioned therein for vertical movement. The elevator car 14 is suspended and coupled to a counterweight 16 for relative movement therewith through a set of elevator ropes 18. Car guide rails 20 and counterweight guide rails 22 provide T-shaped tracks which guide the elevator car 14 and counterweight 16 respectively throughout the hoistway 12. An elevator machine 24 driven by a 3 phase 4 pole permanent magnet synchronous motor 26 is located in elevator machine room 28 and provides the mechanical power to hoist the elevator car 14 and passengers.

An elevator control system 29 includes an Alternating Current Variable Frequency (ACVF) drive 30 and an elevator control unit 34. The electrical power source for motor 26 is supplied by the ACVF drive 30 through transmission line 32. The speed of the synchronous motor 26 is therefore controlled by varying the output frequency of the ACVF drive 30. The elevator control unit 34 receives data through transmission line 36 indicative of elevator functions, e.g., elevator car load, speed and hoistway position, required to control the elevator car 14. The control unit 34 processes the data and supplies control signals to the ACVF drive 30 through transmission line 38. The ACVF drive 30 includes a solid state power source and associated control circuits, and may include memory circuits for storing an executable program for determining the position of a rotor relative to a stator in a synchronous motor. The control circuits of drive 30 are also able to accurately determine applied motor voltage and sensed motor current. An encoder (not shown) connected to the shaft of the motor 26 also transmits shaft position data to the ACVF drive 30 to enable the elevator control system 29 to precisely track the position of the rotor during normal operation.

As is typical for all synchronous motors, rotational speed or mechanical frequency ($\omega_R$) of motor 26 is equal to, or is an integer submultiple of the frequency of the electrical power source ($\omega_S$). The number of poles P (P=4 for motor 26) in a synchronous motor is related to the ratio of electrical frequency $\omega_S$ to mechanical frequency $\omega_R$ as follows: P=2*($\omega_S/\omega_R$). By way of example, in the 4 pole synchronous motor 26, if the electrical frequency of the source is 60 cycles per second or 3600 cycles per minute, than the actual rotational speed of the motor will be 1800 revolutions per minute. Consequently, there is a distinction between electrical degrees and mechanical degrees for the synchronous motor. For the 4 pole synchronous motor 26 in this case, 90 electrical degrees represents only 45 mechanical degrees of rotation of the motor.

Figure 2:
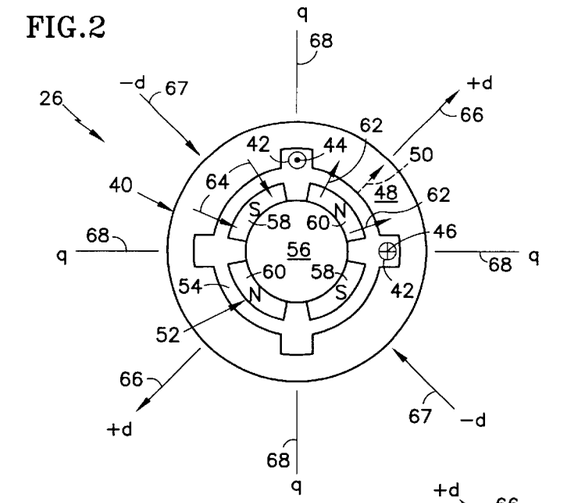
FIG. 2 is a diagrammatic representation of the synchronous motor of FIG. 1 with magnetic flux along the positive d axis locked in alignment and linked with the phase A stator winding.

Referring to FIG. 2, the synchronous motor 26 includes a stator 40 having stator windings wired in 3 phases A, B, and C as is well known. Though the motor 26 is a 3 phase motor, only the single phase A stator winding 42 is shown for purposes of clarity. The direction of a DC current through the phase A winding 42 is represented by the point of an arrow 44 being indicative of current traveling out of the page toward the reader, and by the tail of an arrow 46 being indicative of current traveling into the page away from the reader. The stator also includes a stator back iron 48 around which the phase A stator winding 42 is wound. The stator back iron 48 has a high magnetic permeability which provides a conductive path for the magnetic flux 50 (represented by the dashed arrows) produced by the DC current in the phases of the coil windings 42, i.e., the stator current flux.

The motor 26 also includes a rotor 52 mounted concentric and internal to the stator 40, with an air gap 54 therebetween. The rotor includes an iron rotor core 56 having a pair of permanent magnet south poles 58 and a pair of permanent magnet north poles 60 mounted on its outer surface. The north pole magnets also produce a magnetic flux which conducts radially outward from the north poles as represented by the outwardly directed solid arrows 62. The flux crosses the air gap 54, is conducted through the stator back iron 48 and conducts radially inwardly toward the south poles 58 as represented by the inwardly directed solid arrows 64.

Each north pole pair 60 has a positive direct axis (d axis) 66, and each south pole pair 58 has a negative d axis 67, which is aligned with the direction of the combined magnetic flux of each pole respectively, i.e., the magnetic phasors. Each pole pair 58 and 60 also has a quadrature axis (q axis) 68 which is aligned with the direction of the least amount of magnetic flux generated from the magnets. The q axis 68 may be defined as being exactly 90 electrical degrees for the d axis. In most, but not all, cases the d axis passes through the exact center of the magnets and the q axis passes through the spaces between the north and south pole magnets.

During normal operation, the ACVF drive 30 accurately tracks the position of the rotor 52 relative to the stator 40 by monitoring an index pulse generated from an encoder mounted on the motor shaft. However, after a power failure, the position of the rotor 52 is temporarily lost and the rotor 52, along with its associated d axis 66, can be locked by the elevator's 10 safety brakes anywhere within 360 degrees of its rotation. Since the maximum torque capability of the motor 26 varies with the position of rotor 52 relative to the stator 40, it is important to be able to detect this position before the safety brakes are released.

Elevator motor 26 has a torque capability at zero speed which is typically at least twice that required to support the maximum load imbalance in order to accelerate hoistway inertias. At zero speed, peak torque capability for a given drive current limit is achieved with a torque angle of 90 electrical degrees between stator current flux 50 and the direction of maximum airgap flux, i.e., the d axes 66, 67. In other words, with the stator current flux 50 aligned along the q axis 68 and the airgap magnetic pole flux 62 and 64 aligned along the d axes 67 and 66 respectively. Any deviation in position, θ, from the peak torque angle of 90 electrical degrees, degrades the peak torque capability by the factor of sin(90−θ)=cos(θ) where θ is the absolute position error in electrical degrees. Limiting θ to ±30 electrical degrees ensures that the peak torque capability will not fall below sin(60)=0.866, or a 13% reduction.

By varying the magnitude and/or phase angles of the phases A, B, and C in the 3 phase windings of the motor 26, the ACVF drive 30 can align stator current and stator current flux anywhere within the 360 degrees of its cycle. Therefore knowing the absolute position error θ within ±30 electrical degrees would ensure that there would always be sufficient torque to allow controlled motion of the system to locate the index pulse after a power loss. Once the index pulse is located and power is restored, the precise position of the rotor can then be tracked by the control system 29.

In FIG. 2, the rotor 52 is shown after a power failure with one of the north poles 60 locked in alignment with the phase A stator winding 42. Since the positive d axis 66 of that pole is substantially aligned with the center of the winding 42, the majority of the north pole flux 62 links to the winding 42 and conducts through the stator back iron 48 within the winding 42. In this rotor 52 position the flux 62 from the north pole magnet 60 is large enough to magnetically saturate the stator back iron 48.

Figure 3:
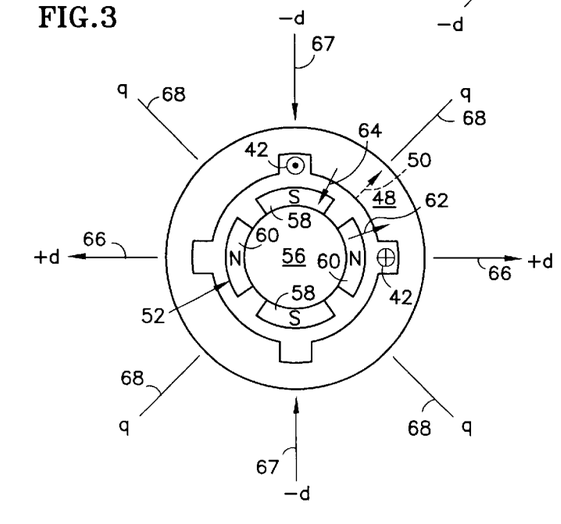
FIG. 3 is a diagrammatic representation of the synchronous motor of FIG. 1 with the magnetic flux along the q axis locked in alignment and linked with the phase A stator winding.

Referring to FIG. 3, the rotor 52 is shown locked in a position where equal amounts of flux 62 from a north pole and flux 64 from a south pole link to the winding 42. In this case the q axis 68 is substantially aligned with the center of the winding 42. Consequently, the north pole flux 62 and the south pole flux 64 work to oppose each other and the stator back iron 48 is not saturated.

Figure 4:
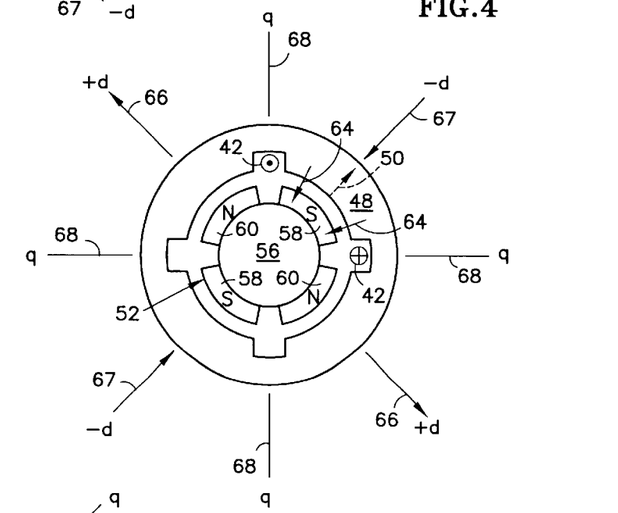
FIG. 4 is a diagrammatic representation of the synchronous motor of FIG. 1 with the magnetic flux along the negative d axis locked in alignment and linked with the phase A stator winding.

Referring to FIG. 4, the rotor 52 is shown locked in a position where one of the south poles 58 is aligned with the winding 42. In this position, the negative d axis of that pole is substantially aligned with the center of the winding 42 and the majority of the south pole flux 64 links to the winding 42. In this case the flux 64 from the south pole magnet 58 is large enough to magnetically saturate the stator back iron 48. Since the inductance of the winding 42 is reduced when the stator iron 48 is saturated, the inductance of the coil is smallest in FIGS. 2 and 4 and the inductance is largest in FIG. 3.

Figure 5:
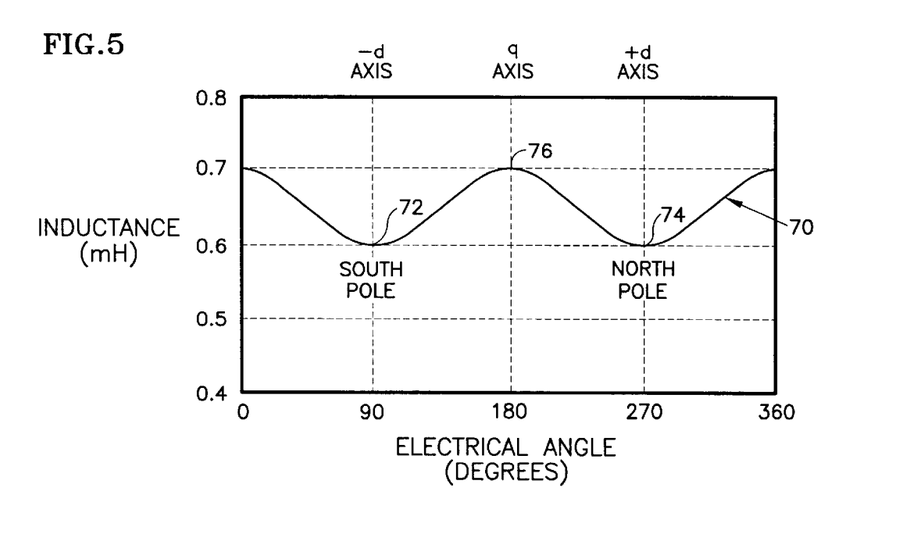
FIG. 5 is a plot of the variation of the stator inductance as a function of the electrical phase angle of the rotor with no DC offset current applied to the stator windings in accordance with the present invention.

Referring to FIG. 5, a plot 70 of the variation of the stator 40 inductance as a function of the electrical angle of the rotor 52 may be obtained by injecting a small AC current into the stator windings and measuring the resultant voltage. In this case no DC stator current is applied, i.e., current indicating arrows 44 and 46 would be removed from FIGS. 2, 3, and 4, and therefore no stator current flux 50 is present. The relative rotor position of FIGS. 2 and 4 are represented by the minimum points 72 and 74 of FIG. 5 and the rotor position of FIG. 3 is represented by the maximum 76 point in between. Since there is no DC current to induce a stator flux 50, the minimum points 72 and 74 of plot 70 are of equal value. The stator 40 inductance (measured as a function of electrical angle) thus has a constant component plus a periodic component comprising primarily a second harmonic frequency. This second-harmonic component is precisely aligned with the magnetic axes of the rotor 52, with the maxima 76 in the positive and negative q-axes 68 and the minima 72, 74 in the positive and negative d-axes 66, 67. Identifying the angular displacement of this second harmonic component relative to the stator electrical reference frame gives the desired location of the rotor d axis 66, 67.

Figure 6:
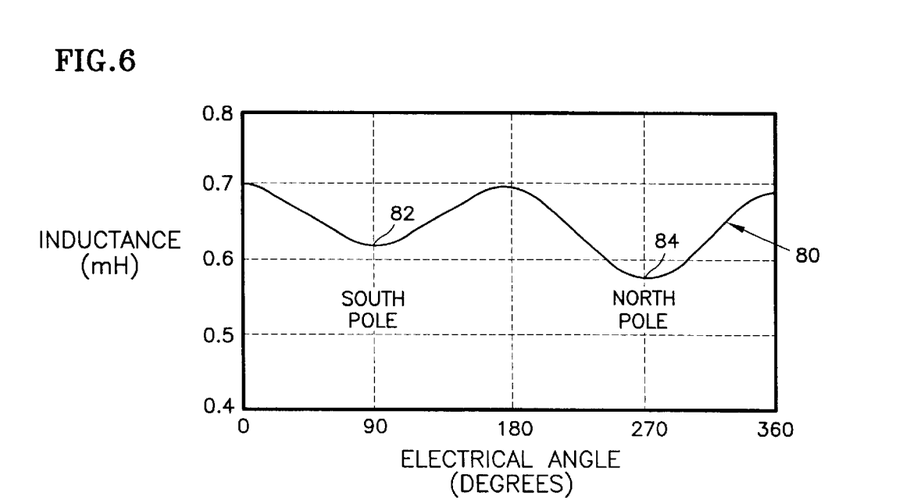
FIG. 6 is a plot of the variation of the stator inductance as a function of the electrical phase angle of the rotor with a DC offset current applied to the stator windings in accordance with the present invention.

Referring to FIG. 6, for proper control of a permanent magnet motor, it is also desirable to distinguish between the positive 66 and negative 67 d axis directions. By way of example, the minimum points on FIG. 5 can not distinguish whether the winding 42 is aligned with a north pole magnet 60 or a south pole magnet 58. To accomplish this an additional step of applying a DC offset current to the winding 42 is performed (as indicated by the directional arrows 44 and 46 in FIGS. 2, 3, and 4) to provide a stator current flux 50.

As plot 80 shows, when a north pole 60 is aligned with the winding 42, the flux 50 produced by the DC current in the winding 42 adds to the flux 62 from the north pole magnet 60 and increases stator saturation. This slightly decreases the inductance at which was present with no stator current flux 50 as shown in FIG. 5 to provide minimum point 82. When a south pole 58 is aligned with the winding 42, the DC current flux 50 from the winding 42 opposes the south pole flux 64 and decreases stator saturation. This slightly increases the inductance that was present with no stator current flux 50 to provide minimum point 84 at a different value than minimum point 82. Since the inductance of the winding 42 is different for north 60 and south 58 poles, one can distinguish the polarity of the rotor pole that is aligned with the winding 42, and therefore discern the positive 66 and negative 67 d axes directions.

Alternatively, by measuring the inductance with a DC offset current injected in addition to an AC current in the stator, both the location and direction of the d axes 66, 67 can be determined in one step. With this additional DC excitation, the iron will saturate more or saturate less depending on the direction of the flux axes 66, 67, and therefore the inductance will exhibit a deeper minimum in the positive than in the negative flux axis direction.

The stator inductance (measured as a function of electrical angle) thus has a constant component plus a periodic component comprising primarily of the first and second harmonic of the electrical angle. The second harmonic component can be used to determine the location of the flux axis as previously described. The first harmonic component can be used to determine the positive direction of the flux axis.

Another significant advantage of imposing a DC current in addition to the AC component needed for the inductance measurement is to prevent the dead time effects in the inverter from affecting the inductance measurement. If only an AC current component is used to measure inductance, the phase current of the motor is crossing zero current at the measurement frequency. The dead time of the switching devices adds an additional voltage component from the commanded voltage at the frequency of the zero crossings. This additional voltage component can have a serious impact on the inductance measurement if the voltage command is used in the impedance calculation (which is desirable). By adding a DC component to the current command, the phase current can be made to not cross zero, which greatly improves the accuracy of the inductance measurement.

With the ACVF drive 30 connected to the PM synchronous motor 26, the drive power section and control electronics can be used to measure the motor stator inductance and determine the location of the rotor flux axis, i.e., d axes 66 and 67. One method (algorithm) for doing this is to apply a small sinusoidal current perturbation and to observe the voltage required to product the current. As will be explained in greater detail hereinafter, it is important to choose a single predetermined frequency which will yield signal levels high enough for accurate measurements. A Discrete Fourier Transform (DFT) can then be used to calculate the complex stator impedance, of which the imaginary part is the inductive reactance. By measuring the stator inductance at a number of points (e.g., 20) within an electrical period, a DFT method can be used to accurately extract the phase of the second harmonic of inductance, even in the presence of noise or higher harmonic components. These inductance measurements can be made at low excitation levels and without offset bias so that no net torque is produced which might move the machine through the brake. Then the additional step of applying a DC bias current can be used to determine d axis direction.

Alternatively, the inductance measurements can be made with a DC offset current imposed on the AC current to determine both location and direction of the d axis in one step. It is important that the DC component be substantially equal to or larger than the amplitude of the AC component in order to prevent the phase current from crossing zero. It is also important that the DC component be relatively small so that the motor torque produced by the DC current will not unduly load the brake or cause any motion of the rotor. Typically the AC current and the DC current each have an amplitude of about 10% of motor peak rating, resulting in a combined injected AC and DC peak current of approximately 20% of motor peak rating. However, due to the noise immunity of the DFT method of computing impedance, inductance measurements can be made at low excitation levels and still yield accurate results.

Figure 7:
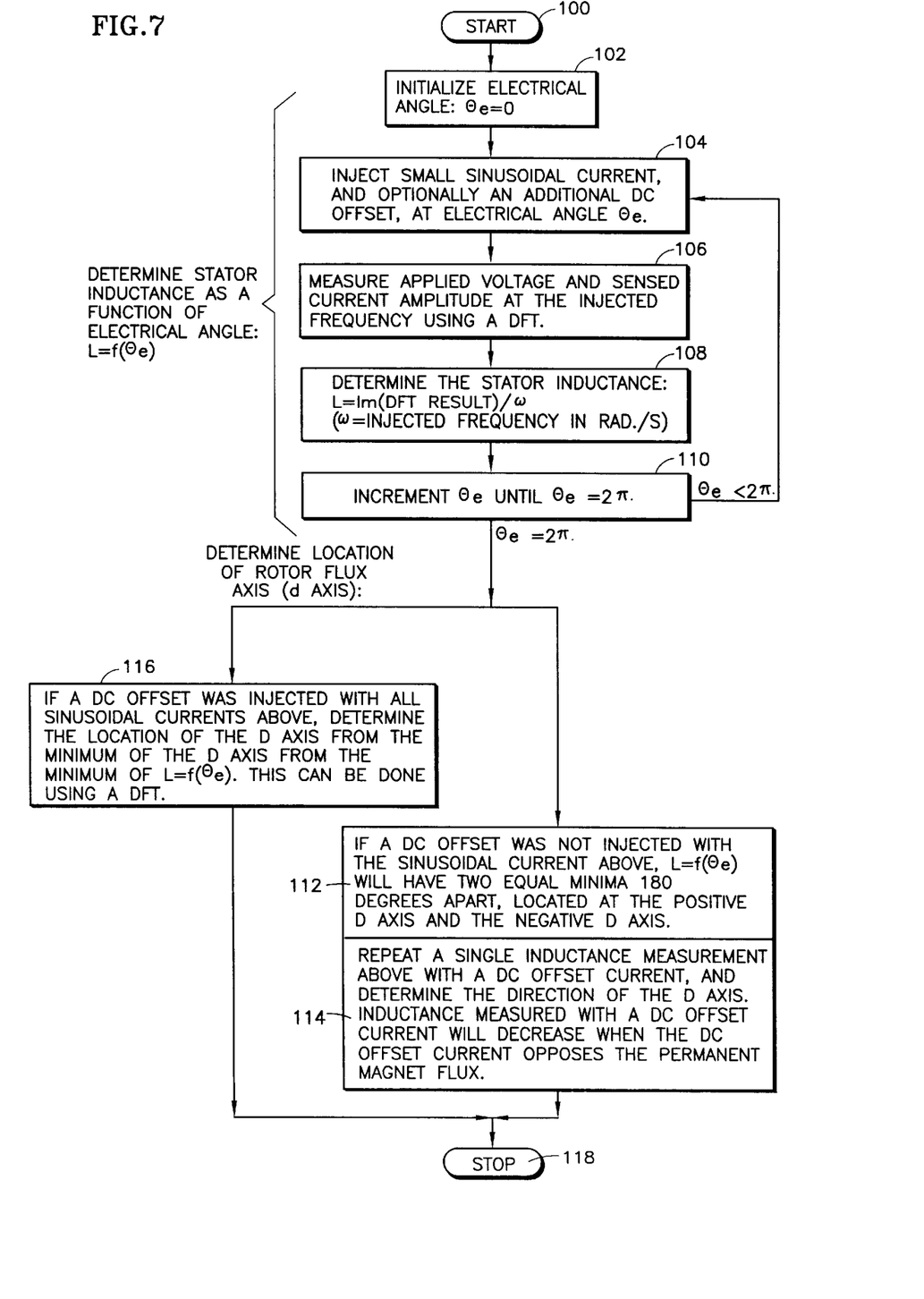
FIG. 7 is a flow diagram of an algorithm for determining absolute angular rotor position (rotor d axis) relative to the stator in accordance with the present invention.

Referring to FIG. 7, a flow diagram of an algorithm for determining the rotor flux axis (d axis) is shown. The algorithm may be implemented as a program within the memory of the elevator control system 29, i.e., the ACVF drive 30 or the control unit 32. After starting the program in block 100, the phase angle θ of the small sinusoidal current to be generated from the ACVF drive 30 is initialized to 0 in block 102. By setting the phase angle θ to zero and incrementing it through 360 electrical degrees, the measurement of inductance can be sweep around the circumference of the stator back iron 48.

In block 104, the ACVF drive 30 is commanded to inject a small AC current at a single predetermined frequency ω and electrical angle θ for a two step determination of d axis position and d axis direction. Optionally, an additional DC offset current may simultaneously be injected if d axis position and direction is to be determined in one step.

Choosing the appropriate frequency ω, it is important to consider the frequencies at which repetitively generated noise may exist. By way of example, the switching frequency of the transistors within the ACVF drive 30 will likely be a source of repetitive noise. If a predetermined frequency ω is chosen such that there are no harmonics or aliasing effects from the transistor switching frequency or other noise generating frequencies, than signal to noise ratios will be higher and inductance measurements will be more accurate.

Proceeding to block 106, the injected current and the resultant voltage are sampled N times per period. Then the complex magnitude and direction of the applied current at the injected frequency ω, i.e., the current phasor I(ω), and the complex magnitude and direction of the resultant voltage, i.e., the voltage phasor V(ω), are measured using a Fourier analysis such as a DFT. Though a DFT is used in this embodiment, other Fourier analysis techniques may also be used, e.g., a Fourier Transform or a Fast Fourier Transform.

The DFT is determined with the following formula:

$$DFT=X(\omega)=1/N\Sigma x(nT)*e^{-j\omega nT}(\text{for } n=0 \text{ to } N-1)=a-jb,$$

where:

X(ω) is the current phasor I(ω), or voltage phasor V(ω) at the angle θ;

N is the number of times the infected current or resultant voltage is sampled per period of time for frequency ω;

T is the sample time;

n is an integer from 1 to N;

x(nT) is the magnitude of the current or voltage sample for that time nT; and a and b are the real and imaginary Cartesian coordinates of the complex X(ω).

The DFT inherently contains a great deal of noise immunity, and therefore inductance measurements can be made at low excitation levels and still yield accurate results. This is because the DFT includes a plurality of N samples for each calculation. Consequently, no one bad sample due to noise can dramatically impact the inductance calculation.

Proceeding to block 108, the stator inductance at the phase angle θ is determined. With locked rotor, the complex impedance behaves just as a resistance R(θ) and an inductance L(θ) where:

$$V(\omega)/=R(\theta)+j\omega L(\theta) \text{ wherein } \omega L(\theta)=\text{the imaginary part of } \{V(\omega)/I(\omega)\}.$$

Therefore $L(\theta)=(b\ 1/\omega)(a_V b_I - a_I b_V)/((a_I)^2+(b_I)^2)$, where:

L(θ) is the inductance of the stator back iron as a function of the angle θ; $a_V$ and $b_V$ are the real and mechanical Cartesian coordinates of the complex V(ω); and $a_I$ and $b_I$ are the real and imaginary Cartesian coordinates of the complex I(ω).

In block 110, the phase angle θ of the injected current is incremented and looped back to block 104 to repeat the process until θ=360 degrees. Therefore, measuring the inductance L(θ) around the circumference of the stator back iron 48. The program will then proceed to either block 112 if a DC offset was not injected, or to block 116 if the DC offset current was injected.

Stepping to block 112, if a DC offset was not injected with the AC sinusoidal current, than L(θ) will have two equal minima 180 degrees apart, located at the positive d axis and the negative d axis as best seen in FIG. 5. The absolute minima can be calculated using time domain or calculated using frequency domain methods by computing the DFT at the first and second harmonic of electrical frequency.

Once the minima are determined, the program proceeds to block 114 which repeats a single inductance measurement with a DC offset current to determine the direction of the d axis. Inductance measured with a DC offset current (such as indicated by arrows 44 and 46 in FIGS. 2, 3, and 4) will produce a DC offset current flux 50 (best seen in FIGS. 2, 3, and 4), which will decrease the inductance when the DC offset current flux opposes the permanent magnet flux and increase the inductance when the DC offset current flux adds to the permanent magnet flux. From this information the direction of the d axis can be determined and the program can step to block 118 where it ends.

If a DC offset was infected with the sinusoidal currents above, the program steps to block 116 where the location of the d axis is determined from the minimum inductance $L(\theta)$ measured. This can be calculated through several techniques, e.g., using well known time domain method, or frequency domain methods such as computing the DFT at the first and second harmonic of electrical frequency.

Figure 8:
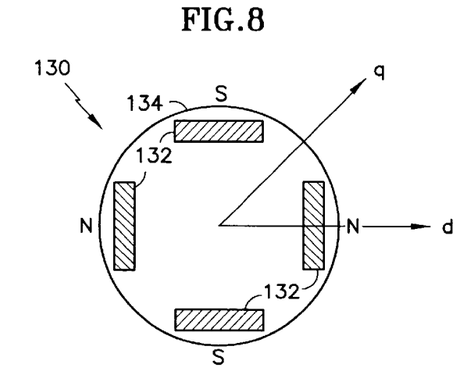
FIG. 8 is a diagrammatic representation of another embodiment of a synchronous motor with the magnets embedded in the rotor iron in accordance with the present invention.
Figure 9:
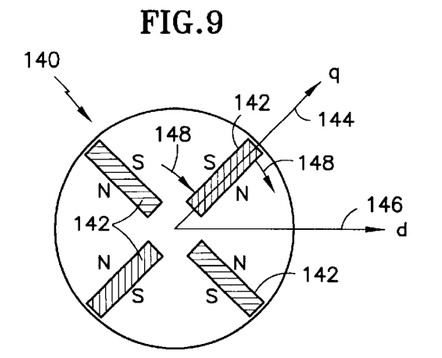
FIG. 9 is a diagrammatic representation of another embodiment of a synchronous motor with the magnets centered on the q axis rather than the d axis in accordance with the present invention.
Figure 10:
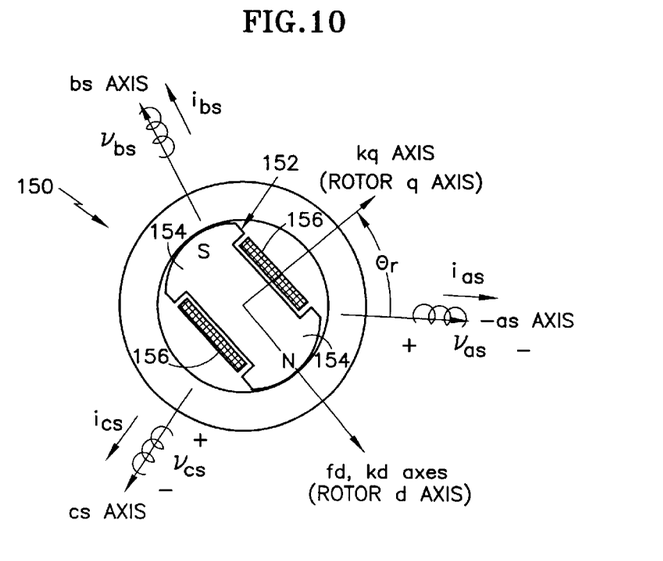
FIG. 10 is a diagrammatic representation of another embodiment of a synchronous motor with a salient pole electrically wound rotor in accordance with the present invention.

Referring to FIGS. 8, 9, and 10, though the synchronous motor described in the above embodiments is a 4 pole surface mounted permanent magnet motor with the poles of the magnets centered on the d axis, the same methodology is applicable to other types of synchronous motors as well. By way of example FIG. 8 is an embodiment of a synchronous motor 130 with the permanent magnets 132 embedded in the rotor 134 iron rather than mounted on the surface of the rotor. In an alternate embodiment, FIG. 9 shows a synchronous motor 140 where the magnets 142 are centered on the q axis 144 rather than the d axis 146. In this case the magnets 142 are oriented so that the magnetic flux 148, which defined the magnitude and direction of the d axis 146, is directed perpendicularly to the radial direction of the q axis 144.

Additionally, the rotor may include electromagnets rather than permanent magnets, for example, FIG. 10 is a synchronous motor 150 having a salient pole wound rotor 152. The rotor 152 includes salient poles 154 with wire coils 156, which are wound on the poles 154 to provide the magnetic flux as required.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of determining the position of a rotor relative to a stator in a synchronous motor at standstill, the method comprising:
   injecting an AC current having a predetermined frequency and a predetermined initial phase angle into a stator coil of the stator;
   sampling the injected current and resultant voltage a predetermined number of times per period of the frequency;
   calculating a stator inductance from the sampled voltages and currents using a Fourier analysis; and
   determining a position of a rotor magnetic flux d axis relative to the stator from the calculated stator inductance.

2. The method of claim 1 wherein the Fourier analysis further comprises a DFT.

3. The method of claim 1 wherein the predetermined frequency further comprises a single predetermined frequency.

4. The method of claim 1 further comprising: incrementing the initial phase angle a predetermined number of times over a 360 degree cycle;
   repeating the injecting, sampling, and calculating with each incremented phase angle to provide a predetermined number of calculated stator inductances; and
   determining the position of the d axis relative to the stator from the calculated stator inductances.

5. The method of claim 4 wherein determining further comprises determining the position of the d axis from the minimum of the calculated stator inductances.

6. The method of claim 5 further comprising;
   injecting a DC offset current after the stator inductances have been calculated; recalculating a single stator inductance; and
   determining the direction of the d axis from the recalculated stator inductance.

7. The method of claim 5 further comprising:
   injecting a DC offset current with the AC current into the stator coil; and
   determining the direction of the d axis from the minimum of the calculated stator inductances.

8. The method of claim 2 wherein the Fourier analysis further comprises using the formula $$DFT = X(\omega) = 1/N \Sigma x(nT) * e^{-j\omega nT} (\text{for } n=0 \text{ to } N-1) = a - jb,$$

where:
   $X(\omega)$ is the current phasor $I(\omega)$ of the injected current at the predetermined frequency $\omega$, or voltage phasor $V(\omega)$ of the resultant voltage at the predetermined frequency $\omega$;
   N is the number of times the infected current or resultant voltage is sampled per period for the frequency $\omega$;
   T is the sample time;
   n is an integer from 1 to N;
   x(nT) is the magnitude of the current or voltage sample for that time nT; and
   a and b are the real and imaginary Cartesian coordinates of the complex $X(\omega)$.

9. The method of claim 8 wherein calculating a stator inductance further comprises calculating the stator inductance from the imaginary part of $V(\omega)/I(\omega)$.

10. The method of claim 9, wherein calculating further comprises using the formula $$L(\theta) = (1/\omega)(a_V b_I - a_I b_V)/((a_I)^2 + (b_I)^2),$$

where:
   $L(\theta)$ is the stator inductance as a function of the predetermined phase angle $\theta$;
   $a_V$ and $b_V$ are the real and mechanical Cartesian coordinates of the complex $V(\omega)$; and
   $a_I$ and $b_I$ are the real and imaginary Cartesian coordinates of the complex $I(\omega)$.

11. The method of claim 1 wherein the predetermined frequency is chosen such that it is free of frequencies or harmonics of frequencies of at least one source of repetitively generated noise.

12. The method of claim 1 wherein the injected AC current is relatively small compared to the motor's rated current.

13. The method of claim 12 wherein the injected AC and DC current is no greater than 20% of the rated current.

14. The method of claim 1 wherein the synchronous motor comprises an elevator machine.

15. An elevator system comprising:
   an elevator car;
   an elevator machine having a synchronous machine for hoisting the elevator car; and a control system including a drive system for driving the synchronous motor, the control system having a memory, including memory for an executable program for determining the position of a rotor relative to a stator in the synchronous motor at standstill by;

injecting an AC current having a predetermined frequency and a predetermined initial phase angle into a stator coil of the stator, sampling the injected current and resultant voltage a predetermined number of times per period of the frequency, calculating a stator inductance from the sampled voltages and currents using a Fourier analysis, and determining a position of a rotor magnetic flux d axis relative to the stator from the calculated stator inductance.

16. The elevator system of claim 15 wherein the Fourier analysis further comprises a DFT.

17. The elevator system of claim 15 wherein the predetermined frequency further comprises a single predetermined frequency.

18. The elevator system of claim 15 further comprising:

incrementing the initial phase angel a predetermined number of times over a 360 degree cycle;

repeating the injecting, sampling, and calculating with each incremented phase angle to provide a predetermined number of calculated stator inductances; and determining the position of the d axis relative to the stator from the calculated stator inductances.

19. The elevator system of claim 18 wherein determining further comprises determining the position of the d axis from the minimum of the calculated stator inductances.

20. The elevator system of claim 19 further comprising;

injecting a DC offset current after the stator inductances have been calculated; recalculating a single stator inductance; and determining the direction of the d axis from the recalculated stator inductance.

21. The elevator system of claim 19 further comprising:

injecting a DC offset current with the AC current into the stator coil; and determining the direction of the d axis from the minimum of the calculated stator inductances.

22. The elevator system of claim 16 wherein the Fourier analysis further comprises using the formula $$DFT = X(\omega) = 1/N \Sigma x(nT) * e^{-j\omega nT} \text{(for } n=0 \text{ to } N-1) = a - jb,$$

where:

$X(\omega)$ is the current phasor $I(\omega)$ of the injected current at the predetermined frequency $\omega$, or voltage phasor $V(\omega)$ of the resultant voltage at the predetermined frequency $\omega$;

N is the number of times the infected current or resultant voltage is sampled per period for the frequency $\omega$;

T is the sample time;

n is an integer from 1 to N;

$x(nT)$ is the magnitude of the current or voltage sample for that time nT; and a and b are the real and imaginary Cartesian coordinates of the complex $X(\omega)$.

23. The elevator system of claim 22 wherein calculating a stator inductance further comprises calculating the stator inductance from the imaginary part of $V(\omega)/I(\omega)$.

24. The elevator system of claim 23, wherein calculating further comprises using the formula $$L(\theta) = (1/\omega)(a_V b_I - a_I b_V)/((a_I)^2 + (b_I)^2),$$

where:

$L(\theta)$ is the stator inductance as a function of the predetermined phase angle $\theta$;

$a_V$ and $b_V$ are the real and mechanical Cartesian coordinates of the complex $V(\omega)$; and $a_I$ and $b_I$ are the real and imaginary Cartesian coordinates of the complex $I(\omega)$.

25. The elevator system of claim 15 wherein the predetermined frequency is chosen such that it is free of frequencies or harmonics of frequencies of at least one source of repetitively generated noise.

26. The elevator system of claim 15 wherein the injected AC current is relatively small compared to the motor's rated current.

27. The elevator system of claim 26 wherein the injected AC and DC current is no greater than 20% of the rated current.

28. The elevator system of claim 15 wherein the drive system further comprises an ACVF drive.

* * * * *